(12) United States Patent
Lin et al.

(10) Patent No.: US 7,567,054 B2
(45) Date of Patent: Jul. 28, 2009

(54) CONTROL CIRCUIT AND METHOD OF CONTROLLING ROTATION FREQUENCY OF SPINDLE IN OPTICAL DISC DRIVE FOR REDUCING FREQUENCY DIFFERENCE OF OUTPUT SIGNALS RESPECTIVELY CORRESPONDING TO DIFFERENT DISC ROTATION MODES

(75) Inventors: Yu-Hsuan Lin, Tai-Chung (TW); Jin-Bin Yang, Changhua County (TW); Chih-Ching Chen, Miao-Li County (TW); Gwo-Huei Wu, Taipei Hsien (TW)

(73) Assignee: Media Tek Inc., Hsin-Chu Hsien (TW)

( * ) Notice: Subject to any disclaimer, the term of this patent is extended or adjusted under 35 U.S.C. 154(b) by 92 days.

(21) Appl. No.: 11/307,962

(22) Filed: Mar. 1, 2006

(65) Prior Publication Data
US 2007/0205737 A1  Sep. 6, 2007

(51) Int. Cl.
*H02P 27/04* (2006.01)
(52) U.S. Cl. .................. 318/807; 369/47.33; 369/53.3
(58) Field of Classification Search ............. 369/53.3, 369/76.53, 47.33, 189, 267, 270.1, 47.45; 324/76.53; 318/567, 599, 807, 607, 503, 318/779; 720/602
See application file for complete search history.

(56) References Cited

U.S. PATENT DOCUMENTS

| 4,611,319 A * | 9/1986 | Naito ............... 369/47.45 |
|---|---|---|
| 4,783,774 A * | 11/1988 | Enomoto ............ 369/44.27 |
| 5,581,525 A * | 12/1996 | Saitoh et al. ......... 369/44.27 |
| 5,982,728 A * | 11/1999 | Okamoto et al. ....... 369/47.4 |
| 6,026,068 A * | 2/2000 | Obata et al. .......... 369/53.2 |
| 6,031,801 A * | 2/2000 | Ishikawa et al. ...... 369/47.24 |
| 6,178,146 B1 * | 1/2001 | Hogan ............... 369/47.41 |
| 6,331,967 B1 * | 12/2001 | Matsui et al. .......... 369/47.3 |
| 6,856,586 B2 * | 2/2005 | Usui et al. ........... 369/47.28 |
| 6,941,445 B2 * | 9/2005 | Yasuda ................ 711/219 |
| 6,958,966 B2 * | 10/2005 | Tateishi et al. ........ 369/53.3 |
| 7,095,689 B2 * | 8/2006 | Chou ................. 369/47.48 |
| 7,123,552 B2 * | 10/2006 | Matsui ............... 369/44.13 |
| 7,145,851 B2 * | 12/2006 | Fukushima et al. ..... 369/47.31 |
| 7,145,855 B2 * | 12/2006 | Ho ................... 369/53.34 |
| 2002/0145961 A1 * | 10/2002 | Tsai et al. ............ 369/53.22 |
| 2003/0030425 A1 * | 2/2003 | Delbo et al. .......... 324/76.53 |
| 2003/0165100 A1 * | 9/2003 | Kikuchi .............. 369/53.3 |
| 2004/0095863 A1 * | 5/2004 | Verboom et al. ....... 369/47.28 |
| 2004/0170097 A1 * | 9/2004 | Mashiko ............. 369/53.3 |
| 2005/0135214 A1 * | 6/2005 | Tsai et al. ............ 369/53.3 |
| 2006/0028940 A1 * | 2/2006 | Morishima ........... 369/47.5 |
| 2007/0153952 A1 * | 7/2007 | Herrin et al. .......... 375/376 |

* cited by examiner

*Primary Examiner*—Bentsu Ro
*Assistant Examiner*—Antony M Paul
(74) *Attorney, Agent, or Firm*—Winston Hsu (57) ABSTRACT

A control circuit and a control method of controlling a rotation frequency of a spindle in an optical disc drive, the control circuit comprising: a spindle controller, electrically coupled to the spindle, for driving the spindle to rotate an optical disc according to a rotation control signal; a detector, electrically coupled to the spindle controller, for detecting the rotation frequency and for generating detecting signals; a frequency-adjusting module, electrically coupled to the detector, for adjusting at least one of the detecting signals to reduce a rotation frequency difference between detecting signals; a signal selector, electrically coupled to the frequency-adjusting module, for receiving output signals generated from the frequency-adjusting module and then outputting the rotation control signal.

25 Claims, 6 Drawing Sheets

CONTROL CIRCUIT AND METHOD OF CONTROLLING ROTATION FREQUENCY OF SPINDLE IN OPTICAL DISC DRIVE FOR REDUCING FREQUENCY DIFFERENCE OF OUTPUT SIGNALS RESPECTIVELY CORRESPONDING TO DIFFERENT DISC ROTATION MODES

BACKGROUND

The present invention relates to a control circuit and a control method of controlling the rotation frequency of a spindle in an optical disc drive, and more particularly, to a control circuit and a control method of controlling the rotation frequency of a spindle in an optical disc drive through reducing a frequency difference between output signals respectively corresponding to different disc rotation modes.

There are two different operation modes for an optical disc drive to access optical discs, as is well known. The first operation mode is a constant linear velocity (CLV) mode and the second operation mode is a constant angular velocity (CAV) mode. According to different requirements, the optical disc drive applies a different mode to read or write data on the disc.

Unfortunately, control methods of the spindle are also different for these two operation modes. In CAV mode, a Hall sensor detects the rotation frequency of the spindle and the servo system generates a rotation control signal to control the spindle rotation frequency to lie between 10 Hz to 100 Hz. In CLV mode, the rotation frequency is detected through a wobble signal read by the pick-up head, or through an RF signal, and is then divided by a frequency divider. The rotation control signal controls the spindle to rotate with a frequency approximately 1 kHz. Because a run-out effect has to be considered in CLV mode, the rotation frequency in CLV mode cannot be reduced below 1 kHz, otherwise the run-out effect will cause data error when the optical disc drive accesses the optical disc.

Therefore, the rotation frequencies of the spindle are different in each operation mode, and subsequently, when the optical disc drive changes from CLV mode to CAV mode, the spindle has to reduce the rotation frequency of the CLV mode to match the rotation frequency of the CAV mode before mode switching can occur. Similarly, when the optical disc drive changes from CAV mode to CLV mode, the spindle has to increase the rotation frequency of the CAV mode to match the rotation frequency of the CLV mode before mode switching can occur.

Figure 1:
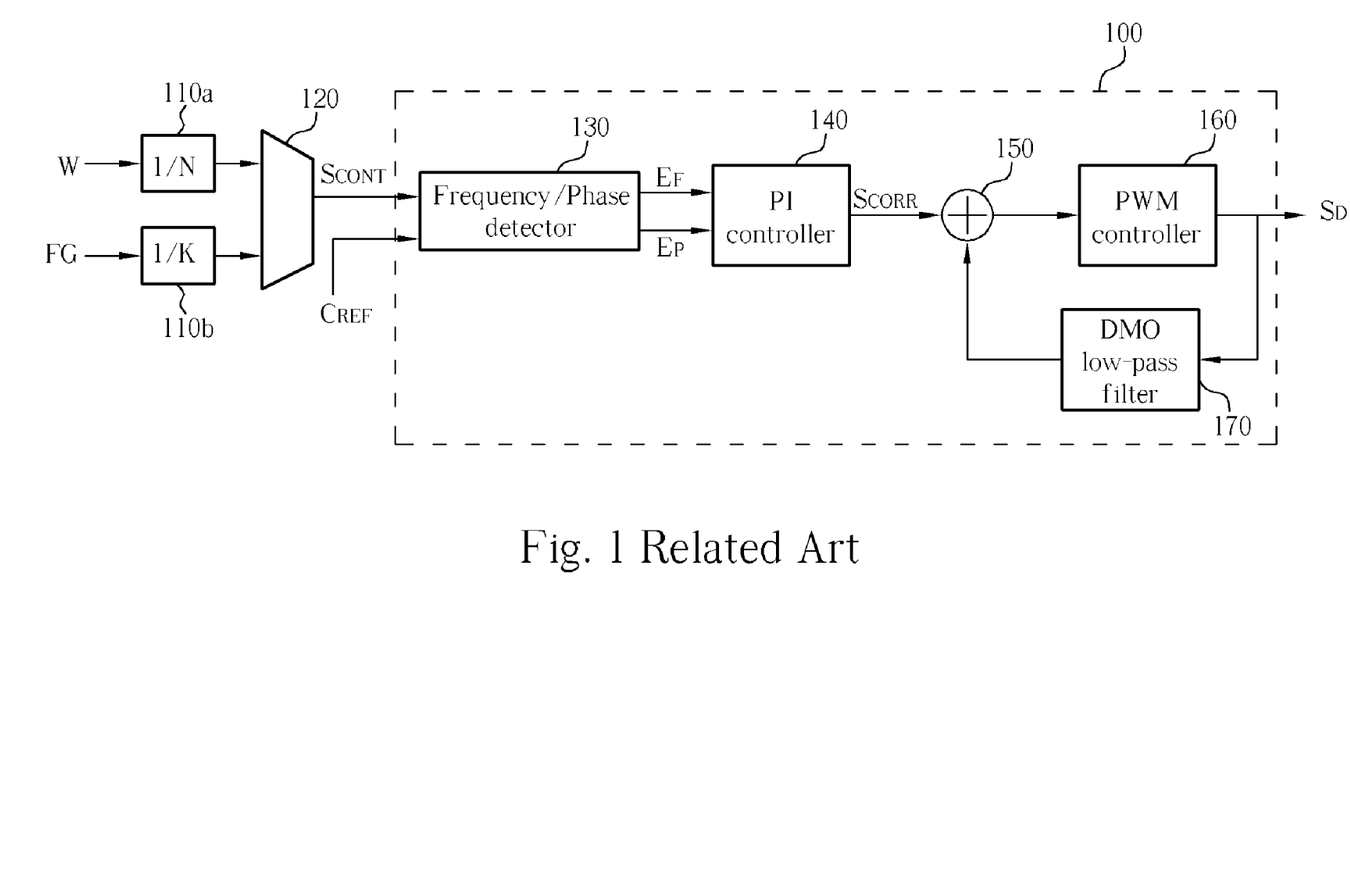
FIG. 1 is a block diagram of spindle controller according to the related art.

Please refer to FIG. 1. FIG. 1 is a block diagram of a spindle controller 100 according to the related art. As the dotted line shows, the spindle controller 100 includes a frequency/phase detector 130, a proportion-integration (PI) controller 140, a mixer 150, a pulse-width modulation (PWM) controller 160, and a digitally modulated output low pass filter (DMOLPF) 170. As discussed above, a wobble signal W is divided by the frequency divider 110a with a divisor N to monitor the rotation frequency in the CLV mode (the frequency is divided so it approaches 1 kHz). Similarly, a detecting signal FG of spindle rotation in the CAV mode is also divided with a divisor K to monitor the rotation frequency in the CAV mode (the frequency is divided so it approaches 10 Hz-100 Hz). The multiplexer 120 selects one input signal as the output, according to the mode the optical disc drive is operating in.

For example, in the CLV mode, the multiplexer 120 selects the input route of the wobble signal W, and outputs a rotation control signal $S_{CONT}$ corresponding to the rotation frequency of the spindle. In CAV mode, the multiplexer 120 selects the input route of the detecting signal FG. Next, the frequency/phase detector 130 compares the rotation control signal $S_{CONT}$ with a reference clock $C_{REF}$ to generate a frequency error signal $E_F$ and a phase error signal $E_P$ according to the rotation control signal $S_{CONT}$. The PI controller 140 receives the frequency error signal $E_F$ and the phase error signal $E_P$ and outputs a corrective signal $S_{CORR}$ to the closed-loop architecture including the mixer 150, the PWM controller 160, and the DMOLPF 170. The closed loop architecture processes the corrective signal $S_{CORR}$ to generate a driving-control signal $S_D$ to control the spindle rotation frequency.

Because the frequencies of the two inputs of the multiplexer 120 differ by a factor of ten, when the mode switch occurs, the multiplexer 120 switches the input route from one input to the other, resulting in the frequency of the output signal (the rotation control signal $S_{CONT}$) changing rapidly and sharply. The significant frequency change of the rotation control signal $S_{CONT}$ introduces added design complexity to the control system, thereby necessitating the consideration of more parameters when stability during adjustment procedures has to be taken into account.

SUMMARY

Therefore, one objective of the present invention is to provide a control circuit and a control method of controlling the rotation frequency of a spindle in an optical disc drive through reducing a frequency difference of output signals corresponding to different disc rotation modes respectively, to solve the above-mentioned problem.

According to an embodiment of the present invention, a control circuit for controlling rotation frequency of a spindle in an optical disc drive is disclosed. The control circuit includes: a spindle controller, electrically coupled to the spindle, for driving the spindle to rotate an optical disc in a first disc rotation mode or in a second disc rotation mode according to a rotation control signal; a detector, electrically coupled to the spindle controller, for detecting the rotation frequency of the spindle and for generating a first detecting signal associated with the first disc rotation mode and generating a second detecting signal associated with the second disc rotation mode; a frequency-adjusting module, electrically coupled to the detector, for adjusting at least one of the first and second detecting signals to reduce a rotation frequency difference between the first detecting signal and the second detecting signal and for outputting a first output signal corresponding to the first disc rotation mode and a second output signal corresponding to the second disc rotation mode; and a signal selector, electrically coupled to the frequency-adjusting module and the spindle controller, for receiving the first and second output signals generated from the frequency-adjusting module and then outputting the rotation control signal, wherein the rotation control signal corresponds to the first output signal when the optical disc is rotated in the first disc rotation mode, and the rotation control signal corresponds to the second output signal when the optical disc is rotated in the second disc rotation mode.

According to another embodiment of the present invention, a control method of controlling a rotation frequency of a spindle in an optical disc drive is disclosed. The control method includes: controlling the spindle to rotate an optical disc in a first disc rotation mode or in a second disc rotation mode according to a rotation control signal; detecting the rotation frequency of the spindle and generating a first detecting signal associated with the first disc rotation mode and generating a second detecting signal associated with the second disc rotation mode; adjusting at least one of the first and second detecting signals to reduce a rotation frequency difference between the first detecting signal and the second detecting signal and then outputting a first output signal corresponding to the first disc rotation mode and a second output signal corresponding to the second disc rotation mode; and receiving the first and second output signals and then outputting the rotation control signal, wherein the rotation control signal corresponds to the first output signal when the optical disc is rotated in the first disc rotation mode, and the rotation control signal corresponds to the second output signal when the optical disc is rotated in the second disc rotation mode.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
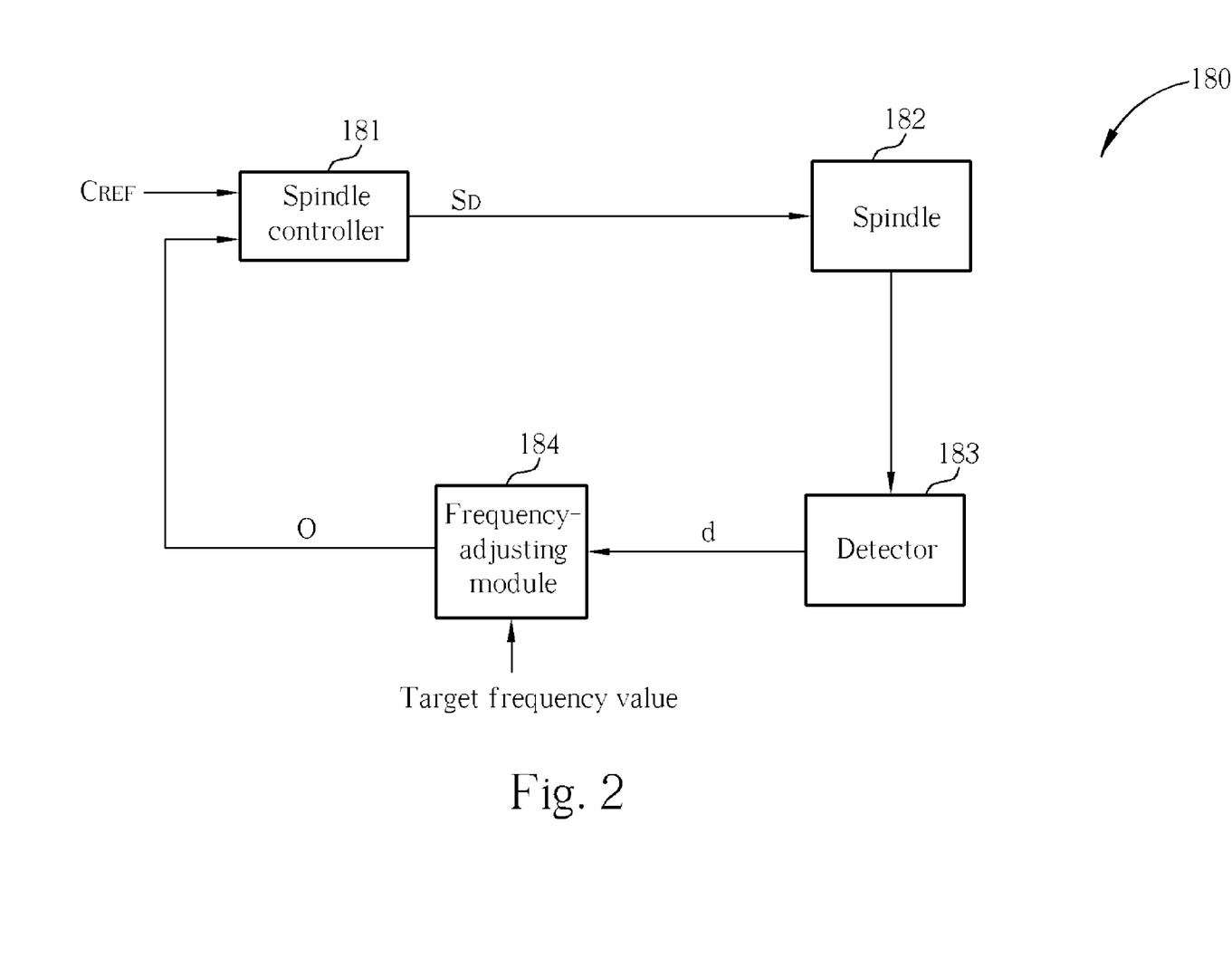
FIG. 2 is a block diagram of a first embodiment of a control circuit according to the present invention.

Please refer to FIG. 2. FIG. 2 is a block diagram of a first embodiment of the control circuit 180 according to the present invention. The control circuit 180 is utilized in an optical disc drive, and the optical disc drive operates in a constant angular (CAV) mode. The control circuit 180 includes a spindle controller 181, a spindle 182, a detector 183, and a frequency-adjusting module 184. It compares an output signal O with a reference clock $C_{REF}$ to generate a driving-control signal $S_D$ to drive the spindle 182 under a desired rotation frequency. The detector 183 detects the rotation frequency of the spindle 182 and outputs a detecting signal d associated with the CLV mode. The frequency-adjusting module 184 receives a target frequency value and rises up the frequency of the detecting signal d to the target frequency. Consequently, the frequency-adjusting module 184 outputs the output signal O having target frequency to the spindle controller 181.

Figure 3:
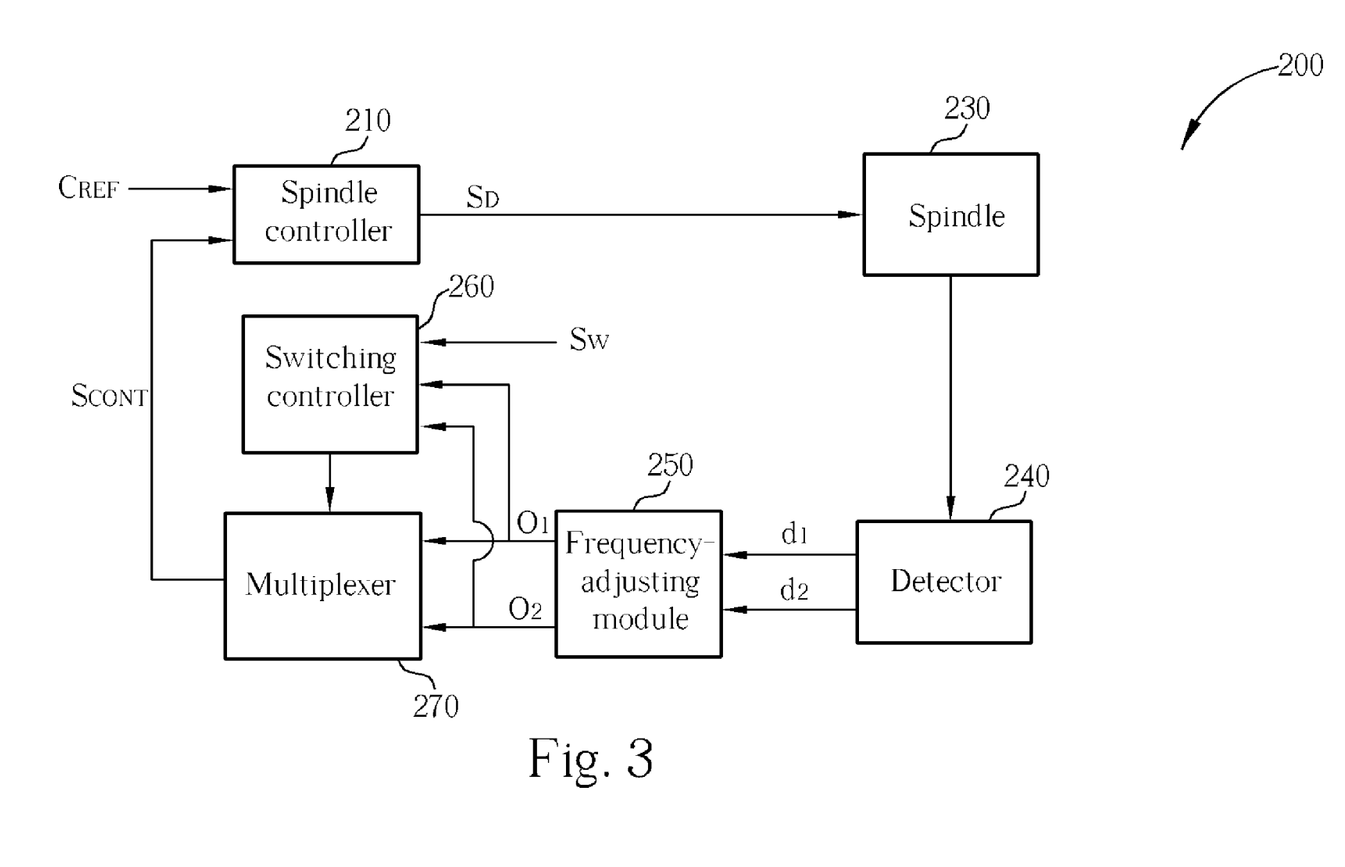
FIG. 3 is a block diagram of a second embodiment of a control circuit according to the present invention.

Please refer to FIG. 3. FIG. 3 is a block diagram of a second embodiment of the control circuit 200 according to the present invention. The control circuit 200 includes a spindle controller 210, a spindle 230, a detector 240, a frequency-adjusting module 250, a switching controller 260, and a signal selector such as a multiplexer 270. The structure and function of the spindle controller 210 are similar to the spindle controller 100 shown in FIG. 1, i.e. it is used for comparing a rotation control signal $S_{CONT}$ with a reference clock $C_{REF}$ to generate a driving-control signal $S_D$ to drive the spindle 230 under a desired rotation frequency.

Due to the optical disc drive having two operation modes, CAV mode and CLV mode, for different application circumstances, the spindle 230 also has two rotation frequencies respectively corresponding to the CAV mode and the CLV mode. The detector 240 detects the rotation frequency of the spindle 230 and outputs a first detecting signal $d_1$ associated with the CLV mode and outputs a second detecting signal $d_2$ associated with the CAV mode. The frequency-adjusting module 250 then adjusts at least one of the first and second detecting signals to reduce a rotation frequency difference between the CLV mode and the CAV mode. That is, the first detecting signal $d_1$ represents the rotation frequency in CLV mode and the second detecting signal $d_2$ represents the rotation frequency in CAV mode.

As mentioned above, the rotation frequency differs by a factor of ten between two modes, therefore, there is also a frequency difference between the first detecting signal $d_1$ and the second detecting signal $d_2$. Through adjusting the first detecting signal $d_1$ or the second detecting signal $d_2$, the rotation frequency difference between the CLV mode and the CAV mode can be reduced. The frequency-adjusting module 250 outputs a first output signal $O_1$ corresponding to the CLV mode and a second output signal $O_2$ corresponding to the CAV mode into the switching controller 260 and the multiplexer 270 simultaneously. As the two output signals $O_1$ and $O_2$ respectively correspond to CLV mode and CAV mode, the control circuit 200 must select a different output signal for each operation mode. When the control circuit 200 switches operation modes, it also generates a switch signal $S_W$ input to the switching controller 260. After receiving the switch signal $S_W$, the switching controller 260 switches the multiplexer 270 to select either the first output signal $O_1$ or the second output signal $O_2$ as an input signal in accordance with the difference between the first output signal $O_1$ and the second output signal $O_2$, and generates the rotation control signal $S_{CONT}$, wherein the rotation control signal $S_{CONT}$ is the first output signal $O_1$ when the optical disc is rotated in CLV mode, and the rotation control signal $S_{CONT}$ is the second output signal $O_2$ when the optical disc is rotated in CAV mode. Finally, the rotation control signal $S_{CONT}$ is transmitted to the spindle controller 210 to adjust the rotation frequency of the spindle 230. Please note that, the detector 240 is capable of detecting light scribe signal, that is, when the optical disc drive is in a light scribe operation, the present invention still works.

Figure 4:
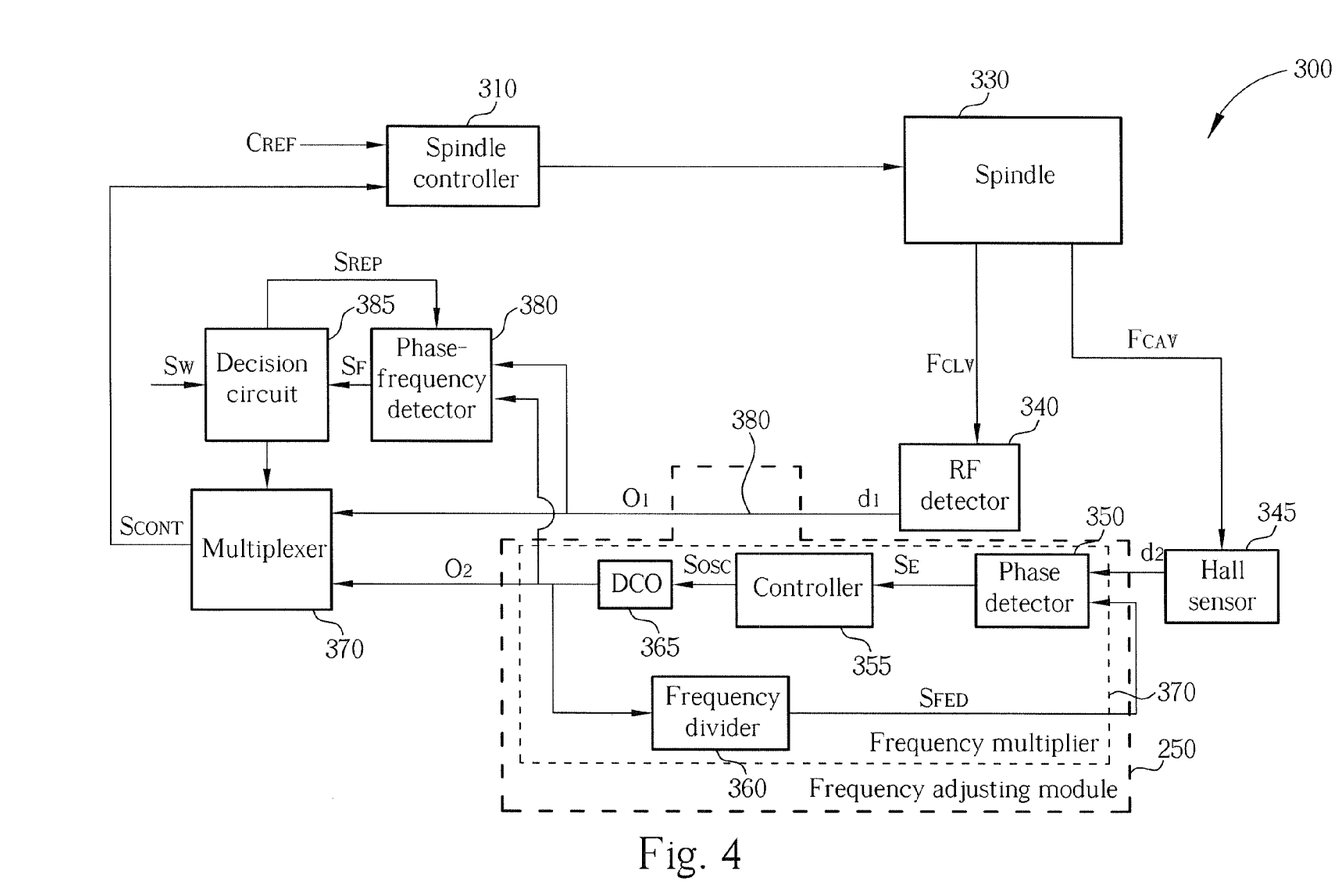
FIG. 4 is a block diagram of a third embodiment of the control circuit according to the present invention.

Please refer to FIG. 4. FIG. 4 is a block diagram of a third embodiment of the control circuit 300 according to the present invention. Some function blocks in the second embodiment are similar to the function blocks shown in the first embodiment, such as a spindle controller 310, a spindle 330, and a signal selector such as a multiplexer 370. The functions of these blocks are the same as the function blocks discussed in the first embodiment; therefore for brevity and clarity, the following description will focus on the other blocks. Please note that the phase detector 350, the controller 355, the frequency divider 360 and the DCO 365 is included in the frequency adjusting module 250 shown in FIG. 3. Please note that a part of the conduction line 380 between the RF decoder 340 and the multiplexer 370 is also included in the frequency adjusting module 250 in this embodiment. Also, the phase detector 350, the controller 355, the frequency divider 360 and the DCO 365 can be regarded as a frequency multiplier 370 for increasing the frequency of the second detection signal to generate the second output signal 02. Besides, the frequency adjusting module 250 in this embodiment outputs the first detection signal $d_1$ as the first output signal $O_1$. The spindle 330 rotates with a rotation frequency $F_{CLV}$ in CLV mode and with a rotation frequency $F_{CAV}$ in CAV mode. In CLV mode, an RF detector 340 detects the rotation frequency $F_{CLV}$ and generates a first detecting signal $d_1$. Because the first detecting signal $d_1$ represents the rotation frequency $F_{CLV}$, the frequency of the first detecting signal $d_1$ is about 1 KHz. In CAV mode, a rotating speed sensor such as a Hall sensor 345 detects the rotation frequency $F_{CAV}$ and generates a second detecting signal $d_2$. Because the second detecting signal $d_2$ represents the rotation frequency $F_{CAV}$, the frequency of the second detecting signal $d_2$ is between 10 Hz to 100 Hz. Therefore, the objective is to increase the frequency of the second detecting signal $d_2$ to approach the frequency level of the first detecting signal $d_1$, similar to the function of the frequency-adjusting module 250 shown in FIG. 1. In this embodiment, a closed-loop PLL is applied to complete the frequency-multiplying procedures.

A phase detector 350 compares phases of the second detecting signal $d_2$ and a feedback signal $S_{FED}$ to generate an error signal $S_E$ identifying synchronization between the second detecting signal $d_2$ and the second output signal $O_2$. A controller 355 is electrically coupled to the phase detector 350, for generating an oscillation control signal $S_{OSC}$ according to the error signal $S_E$, and then a digitally controlled oscillator (DCO) 365 outputs the second output signal $O_2$ according to the oscillation control signal $S_{OSC}$. The second output signal $O_2$ is transmitted into a frequency divider 360 to be divided by a factor M to generate the feedback signal $S_{FED}$. That is, the frequency of the second output signal $O_2$ is higher than the frequency of the second detecting signal $d_2$ by a multiplying factor M. The factor M is a designable parameter of the control circuit 300 according to practical requirements, for example, the rotation frequency in the CLV mode is about 1 Khz and the rotation frequency in the CAV mode is 100 Hz, so the factor M is set as 10 to increase the rotation frequency in the CAV mode so it approaches 1 KHz.

The frequency of the second output signal $O_2$ is now close to the frequency of the first detecting signal $d_1$, and these two signals are transmitted into the multiplexer 370 and a phase-frequency detector 380. The phase-frequency detector 380 has a first input and a second input. When the signal frequency of the first input is higher than the signal frequency of the second input, the phase-frequency detector 380 outputs a flag signal $S_F$ representing "up"; when the signal frequency of the first input is lower than the signal frequency of the second input, the phase-frequency detector 380 outputs a flag signal $S_F$ representing "down". Therefore, by monitoring the flag signal $S_F$, it can be determined which input signal frequency is higher. Through this characteristic of the phase-frequency detector 380, the phase-frequency detector 380 receives the first detecting signal $d_1$ associated with CLV mode and the second output signal $O_2$ associated with CAV mode, and then compares the first detecting signal $d_1$ and the second output signal $O_2$ to determine the status of the flag signal $S_F$. If the frequency of either input signal (i.e. the first detecting signal $d_1$ or the second output signal $O_2$) is higher than the other, the flag signal $S_F$ will remain at the same status; but if the frequencies of both input signals are very close, the flag signal $S_F$ will interchange repeatedly, for example, the flag signal status will appear as "up", "down", "up", "down" etc. When the control circuit 300 decides to switch operation modes, a switch signal $S_W$ is delivered to the decision circuit 385, and then the decision circuit 385 starts to monitor the status of the flag signal $S_F$. If the flag signal status starts to interchange repeatedly, the decision circuit 385 switches the multiplexer 370 to select either the first detecting signal $d_1$ or the second output signal $O_2$ according to the operation mode that the control circuit 300 is switched to.

For example, when the control circuit 300 switches operation mode from CLV mode to CAV mode, the phase-frequency detector 380 determines the flag signal status according to the frequency difference between the first detecting signal $d_1$ and the second output signal $O_2$. If the frequency difference is very small, the flag signal status starts to interchange repeatedly, and then the decision circuit 385 controls the multiplexer 370 to switch the input route from the first detecting signal $d_1$ to the second output signal $O_2$. Therefore, the rotation control signal $S_{CONT}$ is the second output signal $O_2$ in CAV mode and is inputted into the spindle controller 310 to control the rotation frequency of the spindle 330. When the control circuit 300 switches operation mode from CAV mode to CLV mode, the phase-frequency detector 380 determines the flag signal status according to the frequency difference between the first detecting signal $d_1$ and the second output signal $O_2$. If the frequency difference is very small, the flag signal status starts to interchange repeatedly, and then the decision circuit 385 controls the multiplexer 370 to switch the input route from the second output signal $O_2$ to the first detecting signal $d_1$.

Figure 5:
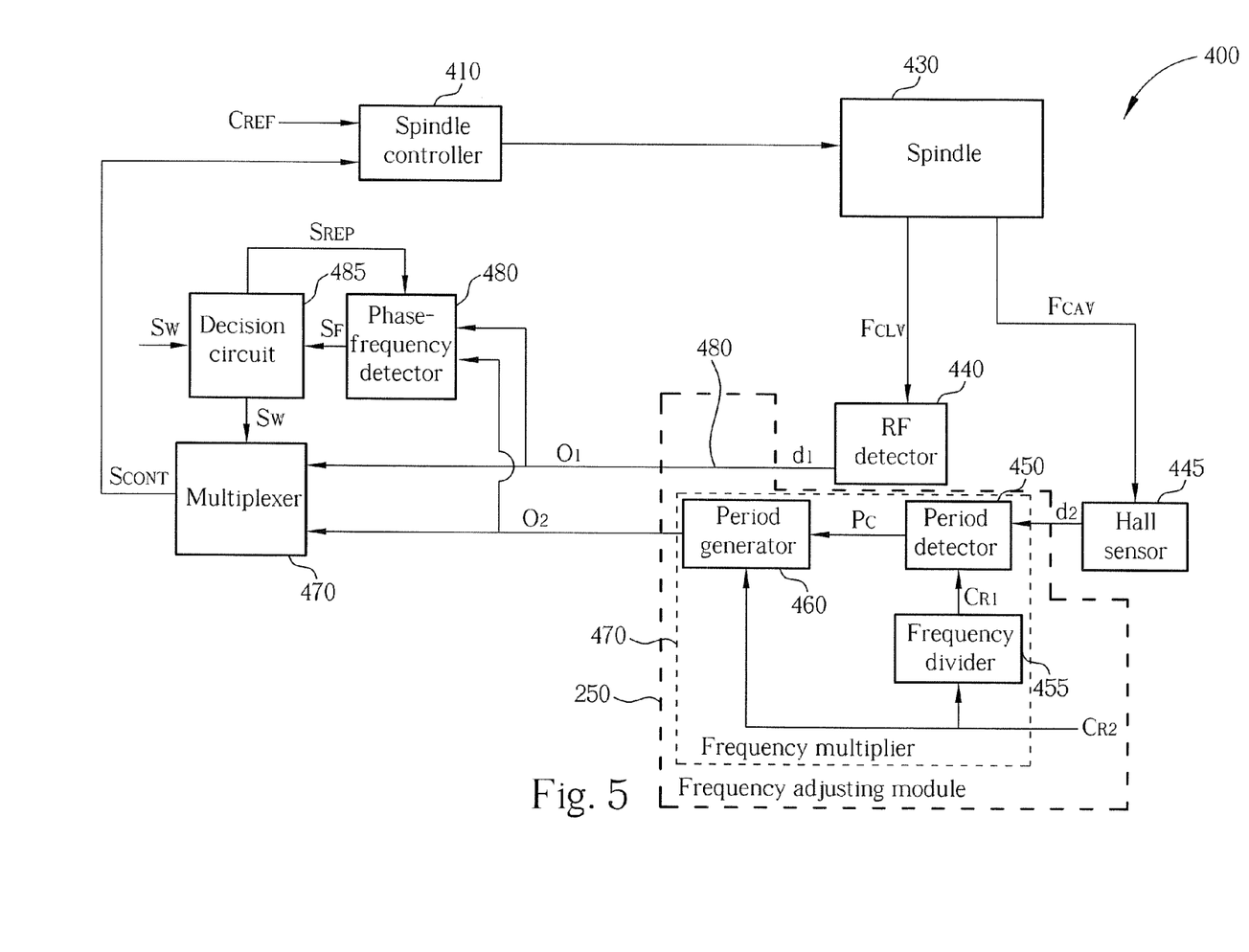
FIG. 5 is a block diagram of a fourth embodiment of the control circuit according to the present invention.

Please refer to FIG. 5. FIG. 5 is a block diagram of a fourth embodiment of the control circuit 400 according to the present invention. The control circuit 400 includes a spindle controller 410, a spindle 430, a RF detector 440, a Hall sensor 445, a period detector 450, a frequency divider 455, a period generator 460, a signal selector such as a multiplexer 470, a phase-frequency detector 480, and a decision circuit 485. Please note that the period detector 450, the frequency divider 455, and the period generator 460 can be included in the frequency adjusting module 250 shown in F*ig*. 3. Please note that a part of the conduction line 480 between the RF decoder 440 and the multiplexer 470 is also included in the frequency adjusting module 250 in this embodiment. Also, the period detector 450, the frequency divider 455, and the period generator 460 can be regarded as a frequency multiplier 470 for increasing the frequency of the second detection signal to generate the second output signal $O_2$. Besides, the frequency adjusting module 250 in this embodiment outputs the first detection signal $d_1$ as the first output signal $O_1$. The difference between the fourth embodiment and the third embodiment is that the circuit increases the frequency of the second detecting signal d2 so it approaches the frequency of the first detecting signal d1. In the fourth embodiment, the Hall sensor 445 detects the rotation frequency of the spindle 430 in CAV mode, and outputs the second detecting signal d2 associated with the CAV mode. The period detector 450 receives the second detecting signal d2 and utilizes a first reference clock CR1 with a higher frequency than the second detecting signal d2 to count several periods of the second detecting signal d2, in other words, to count how many periods of the first reference clock CR1 are included in one period of the second detecting signal d2. Then, the period detector 450 generates a period count PC corresponding to clock cycles of the first reference clock CR1 within the period of the second detecting signal d2. Finally, the period generator 460 utilizes a second reference clock to reform a second Output signal O2 according to the period count PC.

It is obvious that the multiple between the first reference clock $C_{R1}$ and the second reference clock $C_{R2}$ equals the multiple between the second output signal $O_2$ and the second detecting signal $d_2$. As FIG. 5 shows, through utilizing the frequency divider 455 to divide the second reference clock $C_{R2}$ to generate the first reference clock $C_{R1}$ with a factor M, the frequency of the second reference clock $C_{R2}$ will equal the factor M multiplied by the frequency of the first reference clock $C_{R1}$, and the frequency of the second output signal $O_2$ will equal the factor M multiplied by the frequency of the second detecting signal $d_2$. For example, the rotation frequency in CLV mode is approximately 1 Khz and the rotation frequency in CAV mode is 100 Hz, so the factor M is set as 10 to increase the rotation frequency in the CAV mode so it approaches 1 KHz. Please note that, this embodiment divides the second reference clock $C_{R2}$ by the factor M to generate the first reference clock $C_{R1}$, but it is also allowed to generate the first reference clock $C_{R1}$ and the second reference clock $C_{R2}$ individually and independently.

Figure 6:
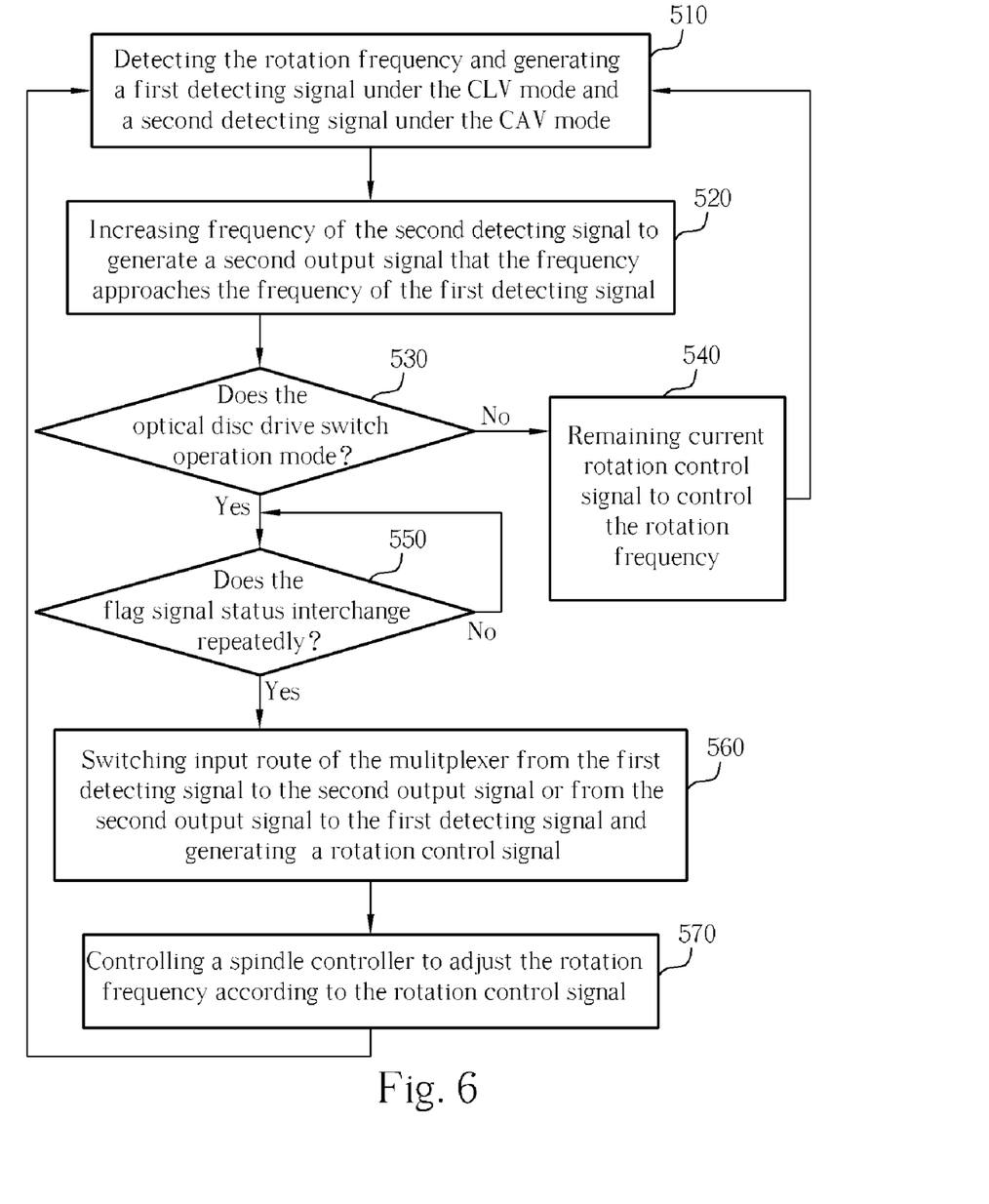
FIG. 6 is a flowchart of an embodiment of the control method according to the present invention.

Please refer to FIG. 6. FIG. 6 is a flowchart of an embodiment of the control method according to the present invention. The present invention discloses a control method of controlling rotation frequency of a spindle in an optical disc drive. A detailed discussion of the steps is provided below:

Step 510: Detect the rotation frequency and generate a first detecting signal under CLV mode and a second detecting signal under CAV mode;

Step 520: increase frequency of the second detecting signal to generate a second output signal so the frequency approaches the frequency of the first detecting signal;

Step 530: determine whether the optical disc drive switches operation modes, if YES, jump to step 550; if NO, go to step 540;

Step 540: keep the current rotation control signal to control the rotation frequency, and jump to step 510;

Step 550: determine whether the flag signal status interchanges repeatedly, if YES, go to step 560, if NO, repeat step 550;

Step 560: switch input route of the multiplexer from the first detecting signal to the second output signal or from the second output signal to the first detecting signal and then generate a rotation control signal;

Step 570: control a spindle controller to adjust the rotation frequency according to the rotation control signal; go back to step 510.

Additionally, the main spirit of the invention is adjusting frequencies of both output signals to approach the same value. Therefore, it is possible to increase frequency of low frequency signal to approach frequency of high frequency signal; to decrease frequency of high frequency signal to approach frequency of low frequency signal; increase frequencies of both output signals to approach the same value; or decrease frequencies of both output signals to approach the same value, all included in the claimed invention boundary.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit for controlling a rotation frequency of a spindle in an optical disc drive, the control circuit comprising:
    a spindle controller, electrically coupled to the spindle, for driving the spindle to rotate an optical disc in a first disc rotation mode or in a second disc rotation mode according to a rotation control signal;
    a detector, electrically coupled to the spindle, for detecting the rotation frequency of the spindle, and for generating a first detecting signal associated with the first disc rotation mode or generating a second detecting signal associated with the second disc rotation mode;
    a frequency-adjusting module, electrically coupled to the detector, for adjusting and outputting at least one of a first output signal and a second output signal to reduce a frequency difference therebetween, wherein the first output signal is generated corresponding to the first disc rotation mode, and the second output signal is generated corresponding to the second disc rotation mode; and
    a signal selector, electrically coupled to the frequency-adjusting module and the spindle controller, for receiving the first or second output signals generated from the frequency-adjusting module and outputting the rotation control signal according to the optical disc rotated in the first disc rotation mode or the second disc rotation mode, wherein the rotation control signal corresponds to the first output signal when the optical disc is rotated in the first disc rotation mode, and the rotation control signal corresponds to the second output signal when the optical disc is rotated in the second disc rotation mode.

2. The control circuit of claim 1, wherein the frequency of the first detecting signal is higher than the frequency of the second detecting signal, and the frequency-adjusting module comprises a frequency multiplier for increasing the frequency of the second detecting signal to reduce the frequency difference between the first detecting signal and the second detecting signal.

3. The control circuit of claim 2, wherein the first disc rotation mode is a constant linear velocity (CLV) mode, and the second disc rotation mode is a constant angular velocity (CAV) mode.

4. The control circuit of claim 2, wherein the frequency multiplier comprises:
    a phase detector, for comparing phases of the second detecting signal and a feedback signal to generate an error signal;
    a controller, electrically coupled to the phase detector, for generating an oscillation control signal according to the error signal;
    a controllable oscillator, electrically coupled to the controller, for outputting the second output signal according to the oscillation control signal; and
    a frequency divider, electrically coupled to the controllable oscillator and the phase detector, for dividing the frequency of the second output signal by a factor to generate the feedback signal.

5. The control circuit of claim 4, wherein the controllable oscillator is a digitally controlled oscillator (DCO).

6. The control circuit of claim 4, wherein the factor is set to reduce difference between the first output signal and the second output signal in accordance with the first detecting signal and the second detecting signal.

7. The control circuit of claim 2, wherein the frequency multiplier comprises:
    a period detector, for utilizing a first reference clock to count a period of the second detecting signal and generating a period count corresponding to clock cycles of the first reference clock within the period of the second detecting signal; and
    a period generator, electrically coupled to the period detector, for utilizing a second reference clock to generate the second output signal according to the period count.

8. The control circuit of claim 7, wherein the frequency multiplier further comprises:
    a frequency divider for dividing the frequency of the second reference clock by a factor to generate the first reference clock.

9. The control circuit of claim 8, wherein the factor is set to reduce difference between the first output signal and the second output signal in accordance with the first detecting signal and the second detecting signal.

10. The control circuit of claim 1, further comprising:
    a switching controller, electrically coupled to the frequency-adjusting module and the signal selector, for deciding switching timing between the first and second disc rotation modes, the switching controller comprising:
    a phase-frequency detector, for comparing the first and second output signals to generate a flag signal; and a decision circuit, electrically coupled to the phase-frequency detector, for controlling the signal selector to select either the first output signal or the second output signal as the rotation control signal according to the flag signal.

11. The control circuit of claim 1, wherein the first disc rotation mode is a constant linear velocity (CLV) mode, and the second disc rotation mode is a constant angular velocity (CAV) mode.

12. The control circuit of claim 1, wherein the signal selector is a multiplexer.

13. A control method of controlling rotation frequency of a spindle in an optical disc drive, the control method comprising:
    controlling the spindle to rotate an optical disc in a first disc rotation mode or in a second disc rotation mode according to a rotation control signal;
    detecting the rotation frequency and generating a first detecting signal associated with the first disc rotation mode or generating a second detecting signal associated with the second disc rotation mode;
    adjusting and outputting at least one of a first output signal and a second output signal to reduce a frequency difference therebetween, wherein the first output signal is generated corresponding to the first disc rotation mode, and the second output signal is generated corresponding to the second disc rotation mode; and
    receiving the first or second output signals and outputting the rotation control signal according to the optical disc rotated in the first disc rotation mode or the second disc rotation mode, wherein the rotation control signal corresponds to the first output signal when the optical disc is rotated in the first disc rotation mode, and the rotation control signal corresponds to the second output signal when the optical disc is rotated in the second disc rotation mode.

14. The control method of claim 13, wherein the frequency of the first detecting signal is higher than the frequency of the second detecting signal, and the step of adjusting at least one of the first and second detecting signals to reduce a frequency difference comprises:
    increasing the frequency of the second detecting signal to reduce the frequency difference between the first detecting signal and the second detecting signal.

15. The control method of claim 14, wherein the first disc rotation mode is a constant linear velocity (CLV) mode, and the second disc rotation mode is a constant angular velocity (CAV) mode.

16. The control method of claim 14, wherein the step of increasing the frequency of the second detecting signal to reduce the frequency difference comprises:
    comparing phases of the second detecting signal and a feedback signal to generate an error signal;
    generating an oscillation control signal according to the error signal;
    outputting the second output signal according to the oscillation control signal; and
    dividing the frequency of the second output signal by a factor to generate the feedback signal.

17. The control method of claim 16, wherein the second output signal is generated by a digitally controlled oscillator.

18. The control method of claim 16, wherein the factor is set to reduce difference between the first detecting signal and the second output signal in accordance with the first detecting signal and the second detecting signal.

19. The control method of claim 14, wherein the step of increasing the frequency of the second detecting signal to reduce the frequency difference comprises:
    utilizing a first reference clock to count a period of the second detecting signal and generating a period count corresponding to clock cycles of the first reference clock within the period of the second detecting signal; and
    utilizing a second reference clock to generate the second output signal according to the period count.

20. The control method of claim 19, wherein the step of increasing the frequency of the second detecting signal to reduce the frequency difference further comprises:
    dividing the frequency of the second reference clock by a factor to generate the first reference clock.

21. The control method of claim 20, wherein the first detecting signal is utilized as the first output signal, and the factor is set to reduce difference between the first output signal and the second output signal in accordance with the first detecting signal and the second detecting signal.

22. The control method of claim 13, further comprising:
    deciding switching timing between the first and second disc rotation modes, further comprising:
    comparing the first and second output signals to generate a flag signal; and
    selecting either the first output signal or the second output signal as the rotation control signal according to the flag signal.

23. The control method of claim 13, wherein the first disc rotation mode is a constant linear velocity (CLV) mode, and the second disc rotation mode is a constant angular velocity (CAV) mode.

24. A control circuit for controlling a spindle in an optical disc drive, the control circuit comprising:
    a spindle controller driving the spindle to rotate an optical disc in a first disc rotation mode or in a second disc rotation mode according to a rotation control signal;
    a detector detecting a rotation frequency derived from the spindle to generate a first detecting signal or a second detecting signal respectively associated with the first disc rotation mode and the second disc rotation mode;
    a frequency-adjusting module adjusting frequency of at least one of the first detecting signal and the second detecting signal and then outputting at least one of a first output signal and a second output signal respectively corresponding to the first detecting signal and the second detecting signal; and
    a signal selector selecting the first or second output signals to be the rotation control signal according to the optical disc rotated in the first disc rotation mode or the second disc rotation mode.

25. A control method of controlling a spindle in an optical disc drive, the control method comprising:
    controlling the spindle to rotate an optical disc in a first disc rotation mode or in a second disc rotation mode according to a rotation control signal;
    detecting a rotation frequency derived from the spindle to generate a first detecting signal associated with the first disc rotation mode or generate a second detecting signal associated with the second disc rotation mode;
    adjusting frequency of at least one of the first detecting signal and the second detecting signal and then outputting at least one of a first output signal and a second output signal respectively corresponding to the first detecting signal and the second detecting signal; and
    selecting the first or second output signals to be the rotation control signal according to the optical disc rotated in the first disc rotation mode or the second disc rotation mode.

* * * * *

UNITED STATES PATENT AND TRADEMARK OFFICE
CERTIFICATE OF CORRECTION

| | |
|---|---|
| PATENT NO. | : 7,567,054 B2 |
| APPLICATION NO. | : 11/307962 |
| DATED | : July 28, 2009 |
| INVENTOR(S) | : Yu-Hsuan Lin et al. |

It is certified that error appears in the above-identified patent and that said Letters Patent is hereby corrected as shown below:

On the title page, item (73), correct the name of the assignee from " Media Tek Inc." to "MediaTek Inc."

Signed and Sealed this

Twenty-second Day of September, 2009

David J. Kappos
*Director of the United States Patent and Trademark Office*